United States Patent
Chen et al.

(10) Patent No.: US 10,364,180 B2
(45) Date of Patent: Jul. 30, 2019

(54) APPARATUS AND METHOD FOR PRODUCING ANTI-GLARE SURFACES

(71) Applicant: CORNING INCORPORATED, Corning, NY (US)

(72) Inventors: Baifeng Chen, Shanghai (CN); Haixing Chen, Shanghai (CN); Ling Chen, Shanghai (CN); Haofei Gong, Shanghai (CN); Jun Hou, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 15 days.

(21) Appl. No.: 15/539,472

(22) PCT Filed: Jan. 6, 2016

(86) PCT No.: PCT/US2016/012290
§ 371 (c)(1),
(2) Date: Jun. 23, 2017

(87) PCT Pub. No.: WO2016/112076
PCT Pub. Date: Jul. 14, 2016

(65) Prior Publication Data
US 2017/0369362 A1    Dec. 28, 2017

Related U.S. Application Data

(60) Provisional application No. 62/100,155, filed on Jan. 6, 2015.

(51) Int. Cl.
*C03C 15/00*    (2006.01)

(52) U.S. Cl.
CPC ................... *C03C 15/00* (2013.01)

(58) Field of Classification Search
CPC ........................................ C03C 15/00
USPC ............................................. 65/31
See application file for complete search history.

(56) References Cited

U.S. PATENT DOCUMENTS

| | | | | |
|---|---|---|---|---|
| 5,277,715 A | * | 1/1994 | Cathey | C03C 15/00 134/10 |
| 6,071,374 A | * | 6/2000 | Kim | C03C 15/00 156/345.18 |
| 6,126,336 A | | 10/2000 | Ferrante | |

(Continued)

FOREIGN PATENT DOCUMENTS

| | | |
|---|---|---|
| CN | 103896496 A | 7/2014 |
| JP | 2003301285 A | 10/2003 |

(Continued)

OTHER PUBLICATIONS

International Search Report and Written Opinion PCT/US2016/012290 dated Jun. 3, 2016.

*Primary Examiner* — Cynthia Szewczyk
(74) *Attorney, Agent, or Firm* — Kevin M. Johnson

(57) ABSTRACT

An apparatus for producing anti-glare surfaces includes an etching cream dipping tank and a sub-tank arranged to receive a slurry of etching cream. A pumping unit is fluidly coupled to the etching cream dipping tank and the sub-tank such that the pumping unit is operable to selectively self-circulate the slurry of etching cream in the sub-tank to improve homogeneity of the etching cream and transfer a volume of the homogenized etching cream from the sub-tank to the etching cream dipping tank.

19 Claims, 2 Drawing Sheets

(56) References Cited

U.S. PATENT DOCUMENTS

| | | | |
|---|---|---|---|
| 8,813,520 B2* | 8/2014 | Hashimoto | C03C 15/00 65/30.14 |
| 2002/0079055 A1* | 6/2002 | Kim | C03C 15/00 156/345.11 |
| 2004/0144750 A1 | 7/2004 | Ballantine et al. | |
| 2011/0267697 A1 | 11/2011 | Kohli et al. | |

FOREIGN PATENT DOCUMENTS

| | | |
|---|---|---|
| JP | 2008192766 A | 8/2008 |
| WO | 2014189775 A1 | 11/2014 |
| WO | 2016069113 A1 | 5/2016 |

* cited by examiner

APPARATUS AND METHOD FOR PRODUCING ANTI-GLARE SURFACES

CROSS-REFERENCE TO RELATED APPLICATIONS

This application is a national stage entry of International Patent Application Serial No. PCT/US16/12290 filed on Jan. 6, 2016, which claims the benefit of priority under 35 U.S.C. § 119 of U.S. Provisional Application Ser. No. 62/100,155 filed on Jan. 6, 2015 the content of which is relied upon and incorporated herein by reference in its entirety.

FIELD

This disclosure relates generally to surface roughening by etching. More specifically, this disclosure relates to production of anti-glare glass with low sparkle level.

BACKGROUND

Anti-glare glass has attracted more interest recently due to the wide application of touch screen, especially for large-size interactive TV, electronic whiteboard, outdoor touch screen, and handheld touch panels. Anti-glare properties are typically provided by creating a textured surface on the glass. The textured surface reduces reflection of light through random scattering of the reflected light. Textured surfaces can be produced by various methods, such as sandblasting, surface coating, plasma etching, wet chemical etching, and screen printing. Some of the methods, such as sandblasting, are difficult to scale up for mass production. Others, such as surface coating, may be too expensive for mass production. Yet, others may generate limited surface texture or roughness. Sparkle may also be of concern with textured surfaces produced by some methods. Sparkle is perceived as twinkling of images on a display where the anti-glare glass is used.

SUMMARY

In one aspect, a method of producing anti-glare surfaces is disclosed. In one embodiment, the method involves supplying a slurry of etching cream into a sub-tank, followed by stirring the etching cream in the sub-tank for a select period to homogenize the etching cream. After the select time period, a volume of the homogenized etching cream is transferred into an etching cream dipping tank. At least one article having a surface that can be roughened by the etching cream, such as glass, is dipped in the volume of homogenized etching cream for another select time period, during which the etching cream roughens exposed surface areas of the at least one article.

In another aspect, a system for producing anti-glare surfaces is disclosed. In one embodiment, the system includes an etching cream dipping tank and a sub-tank configured to contain a slurry of etching cream. The system further includes a pumping unit fluidly coupled to the etching cream dipping tank and the sub-tank such that the pumping unit is operable to selectively self-circulate the slurry of etching cream in the sub-tank and transfer a volume of the homogenized etching cream from the sub-tank to the etching cream dipping tank.

In production of anti-glare glass by use of etching cream, the sparkle level of the final glass is affected by the homogeneity of the etching cream. If the etching cream is not homogeneous, the glass may have a high level of cosmetic defects, which may be observed as sparkle when the glass is used in a display. By homogenizing the etching cream as described generally above and further in the detailed description, the sparkle level of the anti-glare glass can be minimized.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1:
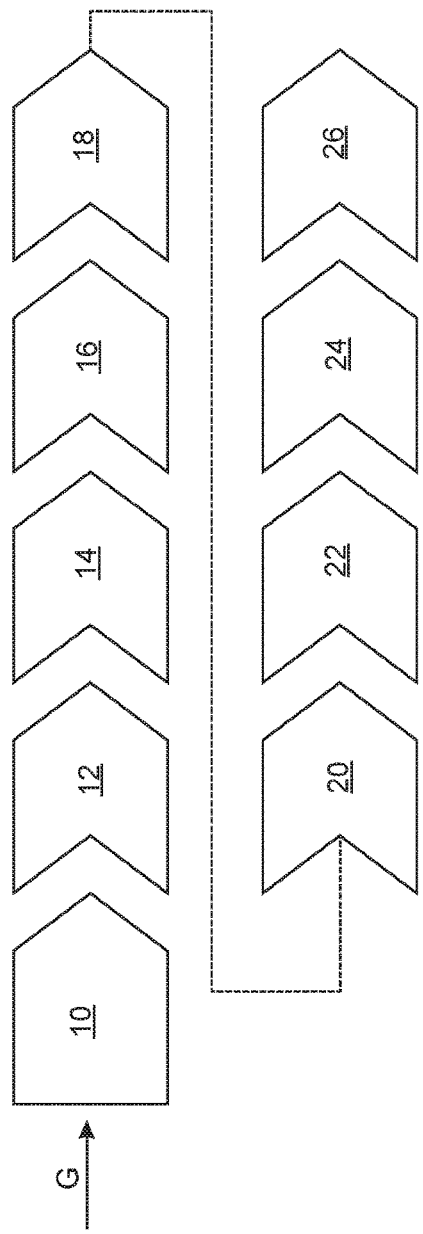
FIG. 1 shows a process for producing anti-glare surfaces according to one embodiment.

FIG. 1 illustrates a process for producing anti-glare surfaces according to one embodiment. The process of FIG. 1 is applicable to materials having surfaces affected by glare, such as glass. Other examples of materials that may be processed are glass-ceramics and other crystalline materials, and generally materials whose surfaces can be roughened by etching cream etching. In the process of FIG. 1, etching cream etching is used to create textured surfaces on glass or other material. At least in the case of glass, the textured surfaces will provide the glass with the anti-glare properties. The input to the process can be one or more articles, each having surface areas to be roughened by the etching cream. For the sake of simplicity, one embodiment of the process of FIG. 1 will be described from the viewpoint of a single glass article G. Typically, the glass article G provided as input to the process will not have any substantial anti-glare properties. Typically, the glass article G provided as input to the process will not have been subjected to an ion-exchange process since the various etchings involved in the process may erode some of the benefits of the ion-exchange process.

In one embodiment of the process of FIG. 1, a glass article G is pre-cleaned to remove surface contaminants from the glass article (10). Pre-cleaning of the glass article G may involve a first cleaning of the glass article G in a detergent, followed by a further cleaning of the glass article G in an ultrasonic bath with deionized water. Other suitable methods may be used to pre-clean the glass article G as desired. After the pre-cleaning (10) of the glass article G, an anti-acid film is laminated to the surface areas of the glass article G where etching is not desired (12). The anti-acid film may be made of a polymer, such as polyethylene, or other suitable material that will be resistant to the various etchants involved in the etching process. Both the pre-cleaning (10) and anti-acid film lamination (12) are preparation steps in the process.

After the anti-acid film lamination (12) of the glass article G, the glass article G may be pre-etched (14). This may involve, for example, immersing the glass article G in an acid solution for a few seconds, such as 5 to 10 seconds (14). The acid solution used in the pre-etching (14) may be, for example, a diluted mixture of hydrofluoric acid (HF) and hydrochloric acid (HCl), or other type of acid solution. The pre-etching removes surface defects and flaws, allowing uniform surface texture formation during the etching cream etching. After the pre-etching (14) time has expired, the glass article G is lifted out of the pre-etching acid solution and rinsed in deionized water for a few seconds (16), such as about 10 seconds.

After the rinsing (16), the glass article G is immersed in an etching cream for several seconds (18), such as about 30 to 120 seconds. Etching cream is a type of slurry or paste etchant, as opposed to any clear solution etchant. It typically contains some insoluble salts or filler suspended in the etchant and thus differs from other etchants. In general, an etching cream may contain several fluorine salts, some insoluble salts, and some soluble salts, all dissolved in some mineral acid to form a slurry. The fluorine salts are the primary etchants in the etching cream and will etch and roughen the surface areas of the glass article G not covered by the anti-acid film. One example of an etching cream is composed of 10-20 wt % ammonium fluoride ($NH_4F$) and ammonium hydrogen difluoride ($NH_4HF_2$) as fluoride salts, 0-10 wt % potassium nitrite ($KNO_3$) as additional salt, 5-20 wt % barium sulfate ($BaSO_4$) as filler, 1-10 wt % soluble starch, and 0-5 wt % polyacrylamide, with hydrochloric acid (HCl) used as the mineral acid. This example etching cream is suitable for use with GORILLA® glass from Corning Incorporated, for example. Other examples of etching creams are possible, generally depending on the composition of the glass article G (or other material type being processed).

After the etching cream etching (18), the glass article G is removed from the etching cream and rinsed with deionized water for a few seconds (20), such as 10 seconds. After the etching cream etching (18), the glass article G will have a hazy surface and anti-glare properties. In one embodiment, the glass article G is further polished by post-etching in an acid solution for several minutes (22), such as 5 to 10 minutes. The post-etching acid solution may be, for example, a mixture of hydrofluoric acid (HF) and hydrochloric acid (HCl). The concentration of the acid solution used in the post-etching (22) may or may not be the same as the concentration of the acid solution used in the pre-etching (14). Additional steps may be carried out between the rinsing (20) and the post-etching (22) to ensure that the glass article G is free of the etching cream prior to the post-etching. These additional steps (not shown in FIG. 1) may involve, for example, immersing the glass article G in an alkaline solution for a few seconds to neutralize any residual etching cream on the glass, and this alkaline treatment may be preceded and followed by cleaning of the glass article in deionized water.

After the post-etching (22), the glass article G is rinsed and cleaned with deionized water thoroughly (24). Then, the glass article G is delaminated (26), i.e., the anti-acid lamination (12) is removed from the glass article, followed by drying the glass article G in air. The resulting glass article G has anti-glare properties and can be used in applications requiring anti-glare properties. After the etching process, the glass article G may be subjected to other processes, such as an ion-exchange process.

Figure 2:
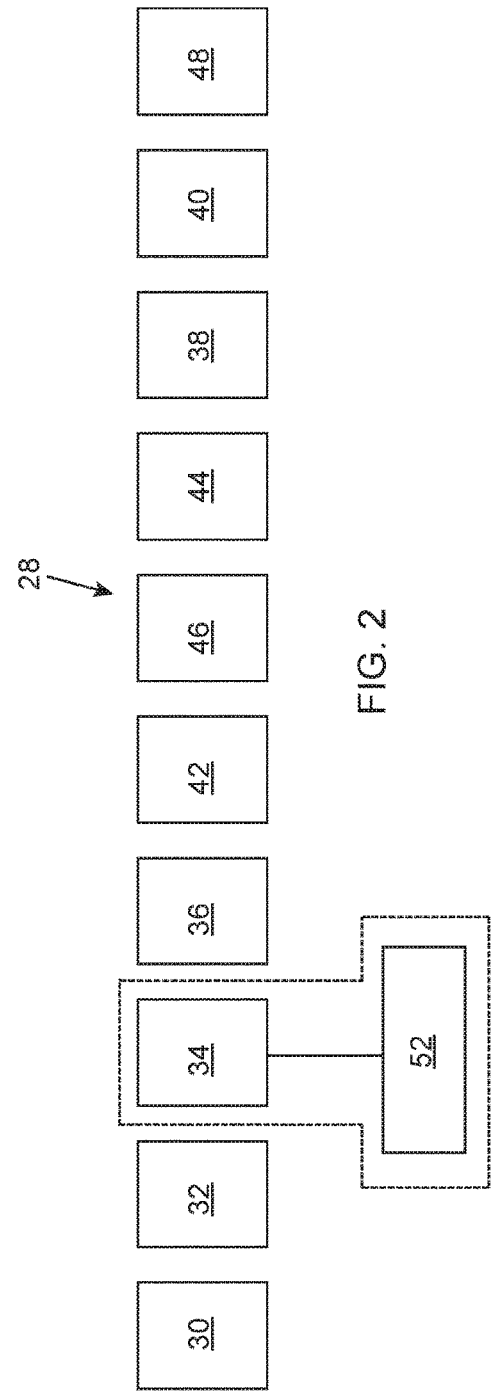
FIG. 2 shows an etching line for production of anti-glare surfaces according to one embodiment.

FIG. 2 shows an etching line 28, according to one embodiment, for mass production of anti-glare surfaces using a process such as described in FIG. 1. The etching line 28 may include an acid dipping tank 30 for pre-etching of glass articles (14 in FIG. 1). The acid dipping tank 30 may be followed by a dipping washing tank 32 for rinsing of glass articles after pre-etching (16 in FIG. 1). The etching line 28 includes an etching cream dipping tank 34 for etching cream etching of glass articles (18 in FIG. 1). The etching cream dipping tank 34 may be followed by a dipping washing tank 36 for rinsing of the glass articles (20 in FIG. 1). Downstream of the dipping washing tank 36 may be an acid dipping tank 38 for the post-etching of glass (22 in FIG. 1) and a dipping washing tank 40 for cleaning of glass (24 of FIG. 1) after post-etching. The etching line 28 may include spray washing tanks 42, 44 and alkaline dipping tank 46 in between the dipping washing tank 36 and acid dipping tank 38. These tanks 42, 44, 46 may be used to ensure that the glass is thoroughly cleansed of etching cream before dipping the glass in the acid dipping tank 38. The etching line 28 may include a spray washing tank 48 after the dipping washing tank 40. The spray washing tank 48 can provide additional cleaning to the glass prior to air drying the glass.

One key issue with mass production of anti-glare glass using etching cream is yield, and one of the main factors affecting yield is cosmetic defects, such as stripes, white smudges, pinholes, etc. These cosmetic defects can come from the non-uniformity of the etching cream slurry during the etching cream process. The cosmetic defects could lead to non-uniform anti-glare feature size and feature size distribution on the glass surface, which may result in a high sparkle level. Homogenizing the etching cream slurry before and during the etching cream process may significantly reduce the cosmetic defects on the etched glass surface, thereby increasing the yield and lowering the sparkle level of the glass.

Figure 3:
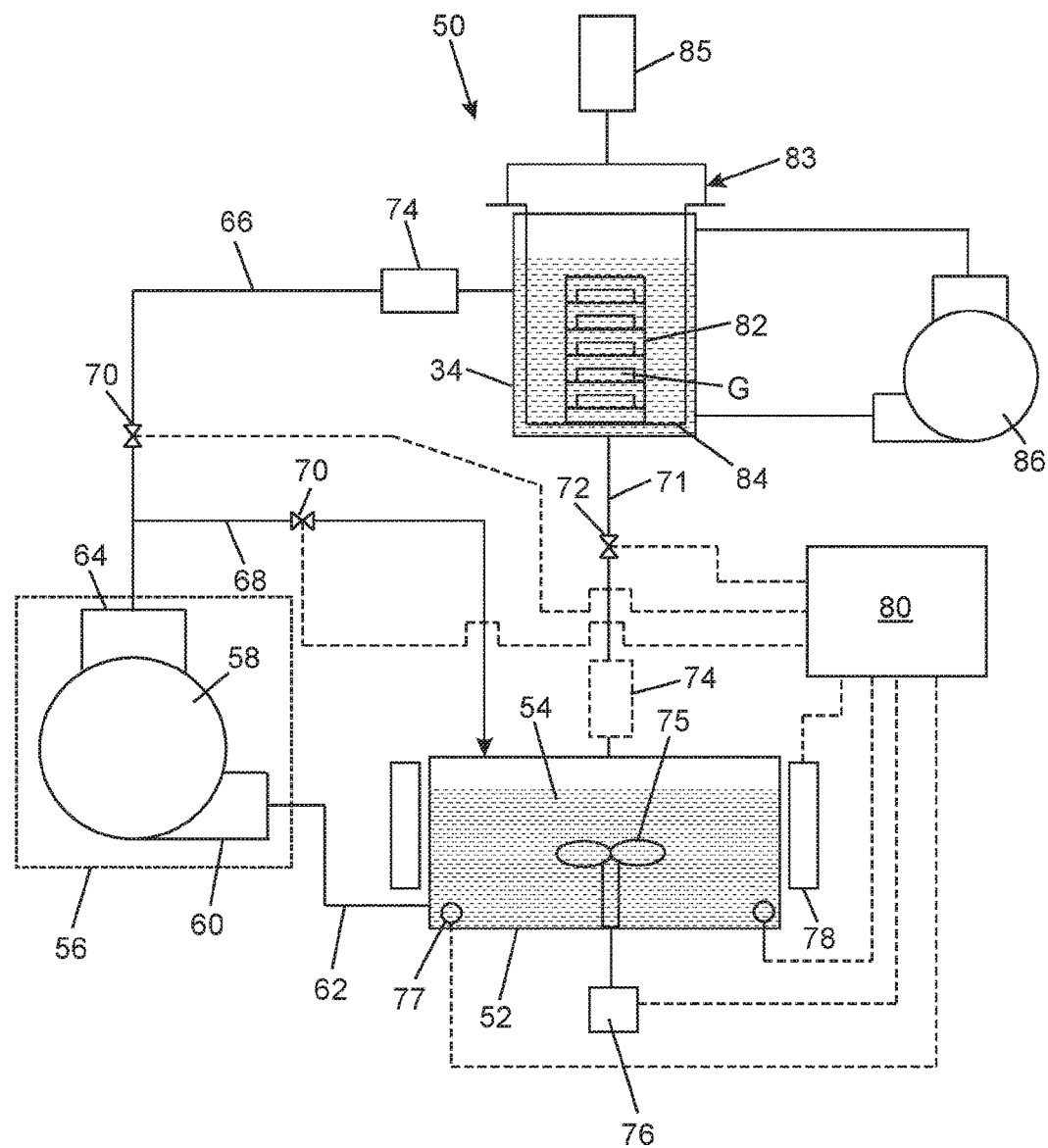
FIG. 3 shows an etching cream homogenizing system according to one embodiment.

FIG. 3 shows an etching cream homogenizing system 50, according to one embodiment. The homogenizing system 50 can be incorporated into the etching line 28 shown in FIG. 2. In one embodiment, the homogenizing system 50 includes the etching cream dipping tank 34 of FIG. 2 and an etching cream sub-tank 52 (also, see FIG. 2). The sub-tank 52 is initially provided with a slurry of etching cream 54 from a suitable source. The homogenizing system 50 includes a pumping unit 56, which is arranged to pump the slurry of etching cream 54 from the sub-tank 52 to the etching cream dipping tank 34 and to self-circulate the slurry of etching cream 54 in the sub-tank 52. The term "self-circulate" as used relative to the sub-tank 52 means that the etching cream is pumped from the sub-tank 52 back into the sub-tank 52. Pumping of the slurry of etching cream 54 into the etching cream dipping tank 34 and self-circulation of the slurry of etching cream 54 in the sub-tank 52 may or may not occur concurrently.

The pumping unit 56 may have one or more pumps. For illustration purposes, in FIG. 3, the pumping unit 56 is shown with one pump 58. In this example, a suction end 60 of the pump 58 is connected to the sub-tank 52 via a flow line 62 and a discharge end 64 of the pump 58 is connected to the etching cream tank 34 and sub-tank 52 via flow lines 66, 68, respectively. Valves 70 may be positioned in the flow lines 66, 68 to determine which of the etching cream dipping tank 34 and etching cream sub-tank 52 will receive etching cream from the pump discharge end 64 at any given time. If more than one pump is included in the pumping unit 56, then one pump could be dedicated to pumping the slurry of etching cream 54 from the sub-tank 52 to the etching cream dipping tank 34 while another pump could be dedicated to self-circulating the slurry in the sub-tank 52.

An agitator 75 may be installed in the sub-tank 52 or otherwise arranged to stir the etching cream 54 in the sub-tank 52. The agitator 75 may be a mechanical device such as a paddle, impeller, or other mechanical member that can be put into motion to stir the etching cream 54 in the auxiliary tank. A motor 76 may be coupled to the agitator 75 to provide the motion.

Both the self-circulation of the etching cream 54 in the sub-tank 52 and the motion of the agitator 75 will act to homogenize the etching cream 54 in the sub-tank 52. This homogenized etching cream 54 can then be transferred to the etching cream dipping tank 34 at the desired time.

The etching cream dipping tank 34 may be provided with a pump 86 for self-circulation of etching cream. The etching cream dipping tank 34 may be provided with a drain line 71 through which etching cream in the etching cream dipping tank 34 can be returned to the sub-tank 52. A valve 72 may be arranged in the drain line 71 to control when etching cream can be drained from the etching cream dipping tank 34 into the etching cream sub-tank 52.

A filtering unit 74 may be arranged to remove large particles and agglomerates formed in the circulating etching cream 54. The filtering unit 74 may include one or more filters made of materials such as nylon or other suitable filter material. There are various suitable locations for the filtering unit 74 within the homogenizing system 50. One example is at the point where the etching cream 54 drains into the sub-tank 52 from the dipping tank 34. Another example could be just before the etching cream 54 enters the dipping tank 34.

Temperature sensors 77 may be arranged to sense the temperature of the etching cream 54 in the sub-tank 52. One or more heating devices 78 may be arranged to provide heat to the sub-tank 52 as needed such that the temperature of the etching cream 54 in the sub-tank 52 is maintained at a desired range suitable for the etching cream etching of glass. The heating device 78 may be controlled using the output of the temperature sensors 77. For example, a controller unit 80 may receive data from the temperature sensors 77 and then send appropriate commands to the heating device 78 to adjust the output of the heating device 78. Cooling devices may also be used to assist in maintaining the desired temperature range for the etching cream.

For mass production of anti-glare glass, several glass articles can be arranged in a suitable carrier (furniture), e.g., carrier 82 in FIG. 3. The carrier 82 can be dipped in each tank along the etching line (28 in FIG. 2) at the appropriate time. Prior to dipping the carrier 82 with the glass articles G in the dipping tank 34, a slurry of etching cream 54 is received in the sub-tank 52 and allowed to self-circulate in the sub-tank 52 for a period of time. This is to improve the homogeneity of the etching cream 54. After this period of time, the etching cream 54 is pumped into the etching cream dipping tank 34 via the pumping unit 56. Once the etching cream level within the etching cream dipping tank 34 is at the appropriate level, the carrier 82 with the glass articles can be dipped or immersed in the etching cream within the etching cream dipping tank 34.

To prevent sedimentation of the etching cream 54 in the dipping tank 34 during the etching cream etching of the glass articles, the etching cream in the etching cream dipping tank 34 may be agitated. The agitator, generally represented at 83, may include, for example, a mounting surface 84 on which the carrier 82 is supported. One or more translation devices or vibrators, simply represented at 85, may be coupled to the mounting surface 84 and operated to provide any combination of vertical, horizontal, rotational, and vibrational motions to the carrier 82. In one example, the mounting surface 84 may be operated to lift and drop the carrier 82 in a specialized frequency and amplitude, such as 10 cycles/minute at 100 mm stroke. Similar agitation systems may be used in the other tanks in the etching line (28 in FIG. 2).

During the process of producing the anti-glare glass, the temperature sensor(s) 76, heating device(s) 78, pumping unit 56, and valve(s) 70 may receive commands from the controller unit 80. The controller unit 80 may include program instructions which when executed will cause self-circulation and agitation of the etching cream 54 in the sub-tank 52 for an appropriate time, followed by transfer of the etching cream 54 from the sub-tank 52 to the dipping tank 34 at the appropriate time, followed by draining of the etching cream 54 from the dipping tank 34 to the sub-tank 52 at the appropriate time. Further, a robot (not shown) may carry the carrier 82 along the etching line and dip the carrier 82 in each tank of the etching line at the appropriate time. The motion of the robot can be synchronized with the circulation of the etching cream 54 such that the carrier 82 is dipped in the etching cream dipping tank 34 at optimum conditions for the etching cream etching of the glass. The robot may also include the motion device(s) 85 that provide motion to the mounting surface 84.

The process, etching line, and etching cream homogenizing system described above are not limited to production of anti-glare glass and may be applicable to other materials that can be roughened by etching cream etching.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An apparatus for producing anti-glare surfaces, comprising:
   an etching cream dipping tank;
   a sub-tank configured to contain a slurry of etching cream; and
   a pumping unit fluidly coupled to the etching cream dipping tank and the sub-tank such that the pumping unit is operable to selectively (i) self-circulate the slurry of etching cream in the sub-tank to improve homogeneity of the etching cream and (ii) transfer a volume of the etching cream from the sub-tank to the etching cream dipping tank, wherein the pumping unit comprises a pump having a suction end fluidly connected to the sub-tank and a discharge end fluidly and separately connected to the etching cream dipping tank and sub-tank.

2. The apparatus of claim 1, further comprising an agitator arranged in the sub-tank and operable to stir the etching cream within the sub-tank.

3. The apparatus of claim 1, further comprising a fluid path for draining the volume of etching cream from the etching cream dipping tank into the sub-tank.

4. The apparatus of claim 1, further comprising an agitator arranged and operable to stir the etching cream within the etching cream dipping tank.

5. The apparatus of claim 4, further comprising a carrier for holding a plurality of articles having surfaces that can be roughened by the etching cream, the carrier being configured for dipping in the volume of etching cream in the etching cream dipping tank, wherein the agitator comprises a mounting surface for the carrier and is operable to stir the etching cream by imparting motion to the mounting surface.

6. The apparatus of claim 1, further comprising a pump coupled to the etching cream dipping tank and operable to self-circulate etching cream in the etching cream dipping tank.

7. The apparatus of claim 1, further comprising at least one temperature sensor arranged to sense temperature of the etching cream inside the sub-tank.

8. The apparatus of claim 7, further comprising at least one heating device for selectively providing heat to the etching cream inside the sub-tank, wherein the at least one heating device is responsive to an output of the at least one temperature sensor.

9. The apparatus of claim 1, wherein the pumping unit further comprises at least one valve arranged in the fluid connections between the discharge end of the pump and the etching cream dipping tank and the sub-tank to control flow of etching cream to the etching cream dipping tank and sub-tank.

10. The apparatus of claim 1, further comprising a filtering unit arranged to filter the etching cream transferred to the etching cream dipping tank.

11. The apparatus of claim 1, further comprising at least one of (a) an acid dipping tank upstream of the etching cream dipping tank for pre-etching of articles, (b) an acid dipping tank downstream of the etching cream dipping tank for post-etching of articles, and (c) an alkaline dipping tank downstream of the etching cream dipping tank.

12. The apparatus of claim 11, further comprising a plurality of washing tanks selected from dipping washing tanks and spray washing tanks for cleaning articles after each etching process.

13. A method for producing anti-glare surfaces, comprising:
supplying a slurry of etching cream into a sub-tank;
stirring the etching cream in the sub-tank for a select time period to homogenize the etching cream;
after the select time period, transferring a volume of the homogenized etching cream into an etching cream dipping tank utilizing a pumping unit; and
dipping at least one article having a surface that can be roughened by the etching cream into the volume of homogenized etching cream in the etching cream dipping tank for another select time period during which an exposed surface area of the at least one article is roughened by the etching cream,
wherein the pumping unit comprises a pump having a suction end fluidly connected to the sub-tank and a discharge end fluidly and separately connected to the etching cream dipping tank and sub-tank.

14. The method of claim 13, wherein stirring the etching cream comprises at least one of self-circulating the etching cream in the sub-tank and mechanically agitating the etching cream.

15. The method of claim 13, further comprising stirring the volume of etching cream in the etching cream dipping tank during at least a portion of dipping the at least one article.

16. The method of claim 15, wherein the at least one article is supported in a carrier, and wherein stirring the volume of etching cream in the etching cream dipping tank comprises imparting motion to the carrier while the carrier is dipped in the volume of etching cream.

17. The method of claim 13, further comprising at least one of (a) pre-etching the at least one article prior to dipping the at least one article into the volume of homogenized etching cream and (b) post-etching the at least one article after dipping the at least one article into the volume of homogenized etching cream.

18. The method of claim 13, further comprising laminating an anti-acid film to a select surface area of the at least one article prior to dipping the at least one article into the volume of homogenized etching cream.

19. The method of claim 13, wherein the at least one article is a glass article.

\* \* \* \* \*